(12) United States Patent
Kim et al.

(10) Patent No.: US 12,504,885 B2
(45) Date of Patent: Dec. 23, 2025

(54) ELECTRONIC DEVICE AND METHOD OF OPERATING THE SAME

(71) Applicant: SK hynix Inc., Gyeonggi-do (KR)

(72) Inventors: Tae Ha Kim, Gyeonggi-do (KR); Jung Ae Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 106 days.

(21) Appl. No.: 17/939,259

(22) Filed: Sep. 7, 2022

(65) Prior Publication Data

US 2023/0315304 A1 Oct. 5, 2023

(30) Foreign Application Priority Data

Mar. 11, 2022 (KR) .......................... 10-2022-0030922

(51) Int. Cl.
*G06F 3/06* (2006.01)
*G06F 1/28* (2006.01)
*G06F 1/30* (2006.01)

(52) U.S. Cl.
CPC .............. *G06F 3/0619* (2013.01); *G06F 1/28* (2013.01); *G06F 1/30* (2013.01); *G06F 3/0656* (2013.01); *G06F 3/0673* (2013.01)

(58) Field of Classification Search
None
See application file for complete search history.

(56) References Cited

U.S. PATENT DOCUMENTS 9,141,177 B1 * 9/2015 Nicholls .............. G11B 19/047
2021/0248842 A1 * 8/2021 Dittrich .............. G06F 11/3013

FOREIGN PATENT DOCUMENTS

KR 10-2014-0104617 A 8/2014
KR 10-2019-0032735 A 3/2019

* cited by examiner

*Primary Examiner* — Michael Alsip
(74) *Attorney, Agent, or Firm* — IP & T GROUP LLP

(57) ABSTRACT

Provided herein is an electronic device including: a host configured to judge a possibility of occurrence of an SPO based on driving information of a transportation device, and determine an operation mode of a storage device to be an SPO protection mode or a performance mode based on the possibility of an SPO occurrence; a buffer memory device configured to temporarily store user data received from the host; a memory device configured to store the user data output from the buffer memory device; and a memory controller configured to set a size of the buffer memory device depending on the determined operation mode and to control the buffer memory device to output at least a part of the user data temporarily stored in the buffer memory device to the memory device based on an amount of the buffer memory device used.

16 Claims, 9 Drawing Sheets

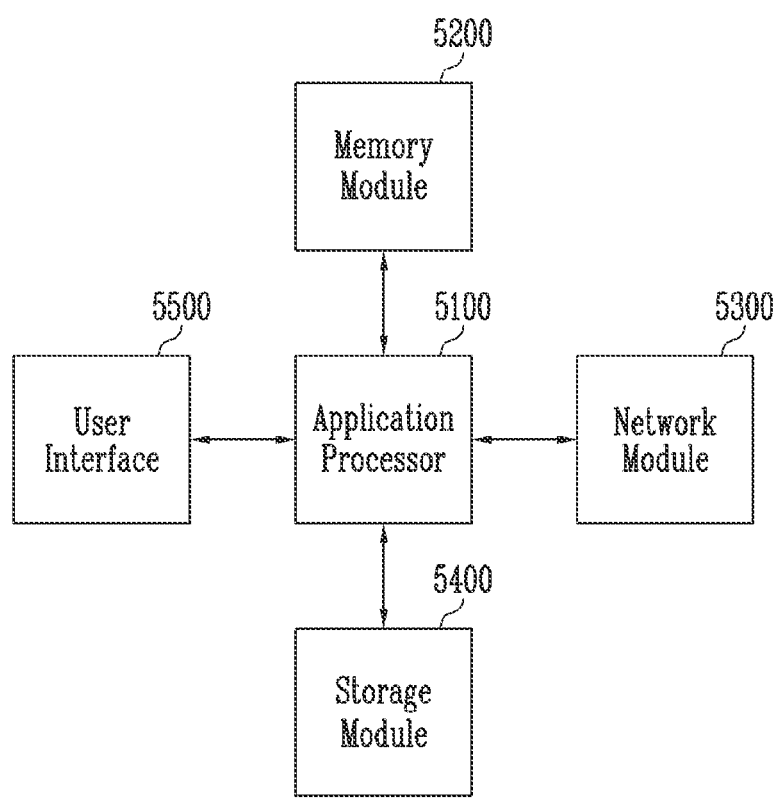

ELECTRONIC DEVICE AND METHOD OF OPERATING THE SAME

CROSS-REFERENCE TO RELATED APPLICATION

The present application claims priority under 35 U.S.C. § 119(a) to Korean patent application number 10-2022-0030922, filed on Mar. 11, 2022, the entire disclosure of which is incorporated herein by reference.

BACKGROUND

1. Field of Invention

Various embodiments of the present disclosure relate to an electronic device, and more particularly to an electronic device including a host and storage device.

2. Description of Related Art

A storage device is a device which stores data under the control of a host device, such as a computer or a smartphone. The storage device may include a memory device in which data is stored and a memory controller which controls the memory device. Such memory devices are classified into a volatile memory device and a nonvolatile memory device.

The volatile memory device is a memory device in which data is stored only when power is supplied and in which stored data is lost when the supply of power is interrupted. Examples of the volatile memory device include a static random access memory (SRAM) and a dynamic random access memory (DRAM).

The nonvolatile memory device is a memory device in which stored data is retained even when the supply of power is interrupted. Examples of the nonvolatile memory device include a read only memory (ROM), a programmable ROM (PROM), an electrically programmable ROM (EPROM), an electrically erasable and programmable ROM (EEPROM), and a flash memory.

SUMMARY

Various embodiments of the present disclosure are directed to an electronic device for preparing for a sudden power-off (SPO) based on driving information of a transportation device, and a method of operating the electronic device.

An embodiment of the present disclosure may provide for an electronic device. The electronic device may include a host configured to judge a possibility of occurrence of a sudden power-off (SPO) based on driving information of a transportation device, and determine an operation mode of a storage device to be an SPO protection mode or a performance mode based on the possibility of occurrence of an SPO, a buffer memory device configured to temporarily store user data received from the host, a memory device configured to store the user data output from the buffer memory device, and a memory controller configured to set a size of the buffer memory device depending on the operation mode, and control the buffer memory device to output at least a part of the user data temporarily stored in the buffer memory device to the memory device based on an amount of the buffer memory device that is used.

An embodiment of the present disclosure may provide for a method of operating an electronic device, the electronic device including a storage device and a host that are provided in a transportation device. The method may include evaluating a possibility of occurrence of a sudden power-off (SPO) based on driving information of the transportation device, determining an operation mode of the storage device including an SPO protection mode or a performance mode based on the possibility of occurrence of an SPO, setting a size of a buffer memory device depending on the determined operation mode, and outputting at least a part of user data temporarily stored in the buffer memory device to a memory device based on an amount of the buffer memory device that is used.

An embodiment of the present disclosure may provide for an operating method of an apparatus mounted on a vehicle and including a host and a memory system. The operating method may include sensing, by the host, one or more of a mobility status of the vehicle and a power status of the memory system; and limiting, by the memory system and based on a result of the sensing, a maximum storage capacity of a buffer memory while operating only in response to a request from the host, wherein the buffer memory is configured to provide a memory device with data buffered therein, wherein the memory device is configured to store therein the provided data, and wherein the buffer memory and the memory device are included in the memory system.

BRIEF DESCRIPTION OF THE DRAWINGS

FIG. 9 is a diagram illustrating a user system according to an embodiment of the present disclosure.

DETAILED DESCRIPTION

Specific structural or functional descriptions of the embodiments of the present disclosure introduced in this specification or application are exemplified to describe embodiments according to the concept of the present disclosure. The embodiments according to the concept of the present disclosure may be practiced in various forms, and should not be construed as being limited to the embodiments described in the specification or application.

Figure 1:
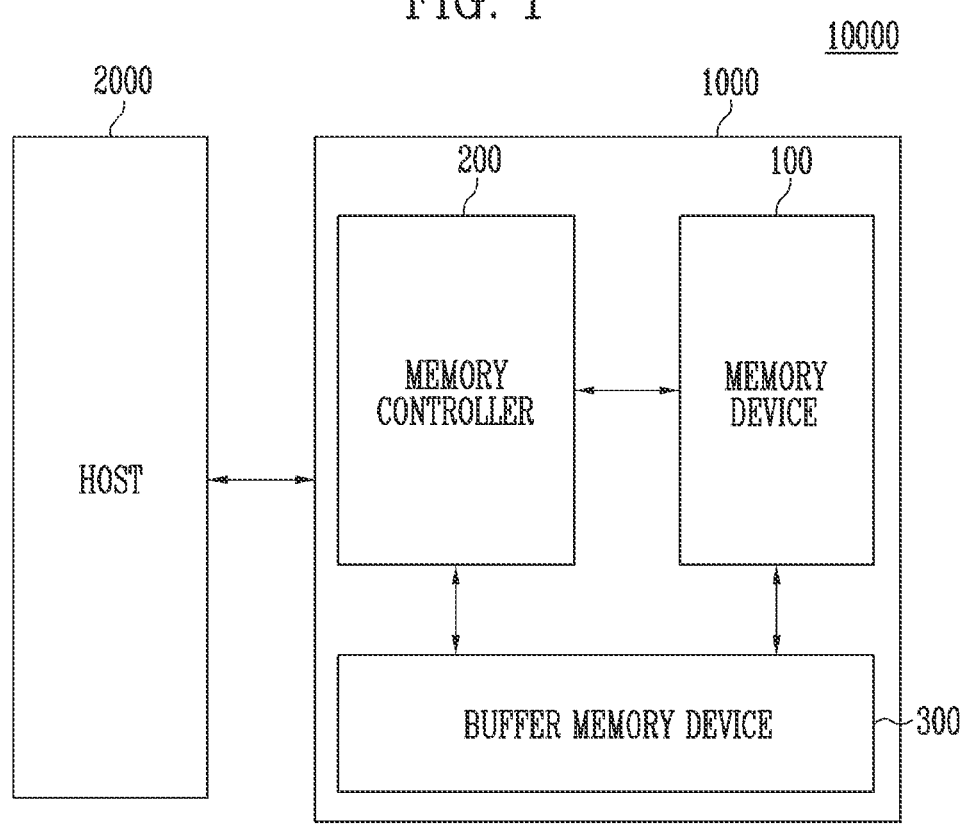
FIG. 1 is a diagram illustrating an electronic device according to an embodiment of the present disclosure.

FIG. 1 is a diagram illustrating an electronic device according to an embodiment of the present disclosure.

Referring to FIG. 1, an electronic device 10000 may include a storage device 1000 and a host 2000. Also, the storage device 1000 may include a memory device 100, a memory controller 200, and a buffer memory device 300.

The electronic device 10000 may be a device provided in a transportation device. In detail, the transportation device may be defined as a transportation means running on a road or rails. For example, the electronic device 10000 may be a device provided in an internal combustion engine vehicle equipped with an engine as a power source, a device provided in a hybrid vehicle equipped with an engine and an electric motor as a power source, or a device provided in an electric vehicle equipped with an electric motor as a power source. The transportation device may include a transportation means that is capable of supplying power, such as a vehicle, a train, a motorcycle, or an airplane, and the electronic device 10000 may be a device provided in the transportation device. The electronic device 10000 may be disposed inside/outside the transportation device or disposed in an area within the transportation device.

In accordance with an embodiment of the present disclosure, the electronic device 10000 may receive driving information (i.e., travel information) of the transportation device from a sensor provided in the transportation device or from external devices. For example, the transportation device may include various types of sensors for detecting an object, such as a camera, a radar, a lidar, an infrared sensor, an ultrasonic sensor, an impact sensor, and an acceleration sensor, and the electronic device 10000 may receive raw data from various types of sensors and identify the driving information of the transportation device, or may receive the driving information of the transportation device in the form of processed secondary data from various types of sensors. Also, the electronic device 10000 may judge the possibility of occurrence of a sudden power-off (SPO) based on the driving information of the transportation device, and may determine the operation mode of the storage device 1000 based on the possibility of occurrence of an SPO.

Here, the storage device 1000 may be a device which stores data under the control of the host 2000, such as a mobile phone, a smartphone, an MP3 player, a laptop computer, a desktop computer, a game console, a display device, a tablet PC, or an infotainment system for transportation devices (e.g., an in-vehicle infotainment system).

The storage device 1000 may be implemented as any one of various types of storage devices depending on a host interface that is a scheme for communication with the host 2000. For example, the storage device 1000 may be implemented as any one of various types of storage devices, for example, a solid state disk (SSD), a multimedia card such as an MMC, an embedded MMC (eMMC), a reduced size MMC (RS-MMC), or a micro-MMC, a secure digital card such as an SD, a mini-SD, or a micro-SD, a universal serial bus (USB) storage device, a universal flash storage (UFS) device, a personal computer memory card international association (PCMCIA) card-type storage device, a peripheral component interconnection (PCI)-card type storage device, a PCI express (PCI-E) card-type storage device, a compact flash (CF) card, a smart media card, and a memory stick.

The storage device 1000 may be implemented in any one of various types of package forms. For example, the storage device 1000 may be implemented in any one of various types of package forms, such as package on package (POP), system in package (SIP), system on chip (SOC), multi-chip package (MCP), chip on board (COB), wafer-level fabricated package (WFP), and wafer-level stack package (WSP).

In accordance with an embodiment of the present disclosure, the storage device 1000 may include the memory device 100, the memory controller 200, and the buffer memory device 300.

The memory device 100 may store data or use the stored data. In detail, the memory device 100 may be operated in response to the control of the memory controller 200. Further, the memory device 100 may include a plurality of memory dies, each of which may include a memory cell array including a plurality of memory cells which store data.

The memory device 100 may be implemented as a double data rate synchronous dynamic random access memory (DDR SDRAM), a low power double data rate fourth generation (LPDDR4) SDRAM, a graphics double data rate (GDDR) SDRAM, a low power DDR (LPDDR) SDRAM, a Rambus dynamic random access memory (RDRAM), a NAND flash memory, a vertical NAND flash memory, a NOR flash memory device, a resistive RAM (RRAM), a phase-change random access memory (PRAM), a magnetoresistive RAM (MRAM), a ferroelectric RAM (FRAM), or a spin transfer torque RAM (STT-RAM).

In accordance with an embodiment of the present disclosure, the memory device 100 may store data received from the buffer memory device 300 under the control of the memory controller 200. Alternatively, the memory device 100 may transmit data stored in the memory device 100 to the buffer memory device 300 or to the memory controller 200 under the control of the memory controller 200.

The memory controller 200 may control the overall operation of the storage device 1000. In detail, when power is applied to the storage device 1000, the memory controller 200 may run firmware (FW). The firmware (FW) may include a host interface layer (HIL) which receives a request input from the host 2000 or outputs a response to the host 2000, a flash translation layer (FTL) which manages an operation between the interface of the host 2000 and the interface of the memory device 100, and a flash interface layer (FIL) which provides a command to the memory device 100 or receives a response from the memory device 100.

The memory controller 200 may receive data and a logical address (LA) from the host 2000, and may translate the logical address into a physical address (PA) indicating the address of memory cells which are included in the memory device 100 and in which data is to be stored. The logical address may be a logical block address (LBA), and the physical address may be a physical block address (PBA).

The memory controller 200 may control the memory device 100 so that a program operation, a read operation or an erase operation is performed in response to a request received from the host 2000. During a program operation, the memory controller 200 may provide a program command, a physical block address, and data to the memory device 100. During a read operation, the memory controller 200 may provide a read command and a physical block address to the memory device 100. During an erase operation, the memory controller 200 may provide an erase command and a physical block address to the memory device 100.

The memory controller 200 may control the memory device 100 so that a program operation, a read operation or an erase operation is internally performed regardless of a request received from the host 2000. For example, the memory controller 200 may control the memory device 100 so that a background operation, such as wear leveling, garbage collection, or read reclaim operation, is performed.

In accordance with an embodiment of the present disclosure, the memory controller 200 may control the memory device 100 to operate in an SPO protection mode under the control of the host 2000. In the SPO protection mode, the memory controller 200 may control the memory device 100 to suspend any background operation being performed.

The buffer memory device 300 may temporarily store data, and may use the temporarily stored data. In detail, the buffer memory device 300 may be a device that temporarily stores the data to be stored in the memory device 100 in response to a request received from the host 2000. The buffer memory device 300 may temporarily store data received from the host 2000 under the control of the memory controller 200. The buffer memory device 300 may include an area in which write data to be stored in the memory device 100 is temporarily stored and an area in which data read from the memory device 100 is temporarily stored.

Also, when the capacity of the buffer memory device 300 reaches a certain level or higher, the memory controller 200 may control the buffer memory device 300 so that the data temporarily stored in the buffer memory device 300 is flushed into the memory device 100. Here, the term "flush" may be an operation of outputting the data temporarily stored in the buffer memory device 300 to the memory device 100, and thereafter deleting the data stored in the buffer memory device 300. The data temporarily stored in the buffer memory device 300 may include mapping data between physical addresses and logical addresses of the memory device 100. Furthermore, the data temporarily stored in the buffer memory device 300 may include user data received from the host 2000.

In accordance with an embodiment of the present disclosure, the size of the buffer memory device 300 may be changed depending on the operation mode determined by the host 2000. For example, when the host 2000 determines the operation mode of the storage device 1000 to be an SPO protection mode, the size of the buffer memory device 300 may be set to a first size, whereas when the host 2000 determines the operation mode of the storage device 1000 to be a performance mode, the size of the buffer memory device 300 may be set to a second size, larger than the first size. That is, the capacity to be allocated to the buffer memory device 300 may be changed depending on the operation mode determined by the host 2000.

The host 2000 may be electrically connected to the storage device 10000, and may then exchange signals with the storage device 1000. In detail, the host 2000 may receive raw data from various types of sensors provided in the transportation device and identify the driving information of the transportation device, or may receive the driving information of the transportation device in the form of processed secondary data from various types of sensors. Also, the host 2000 may judge the possibility of occurrence of a sudden power-off (SPO) based on the driving information of the transportation device. The host 2000 may determine the operation mode of the storage device 1000 based on the possibility of occurrence of an SPO. For this, the host 2000 may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and electrical units for performing other functions.

The host 2000 may communicate with the storage device 1000 using at least one of various communication methods such as universal serial bus (USB), serial AT attachment (SATA), serial attached SCSI (SAS), high speed interchip (HSIC), small computer system interface (SCSI), peripheral component interconnection (PCI), PCI express (PCIe), non-volatile memory express (NVMe), universal flash storage (UFS), secure digital (SD), multimedia card (MMC), embedded MMC (eMMC), dual in-line memory module (DIMM), registered DIMM (RDIMM), and load reduced DIMM (LRDIMM) communication methods.

Figure 2:
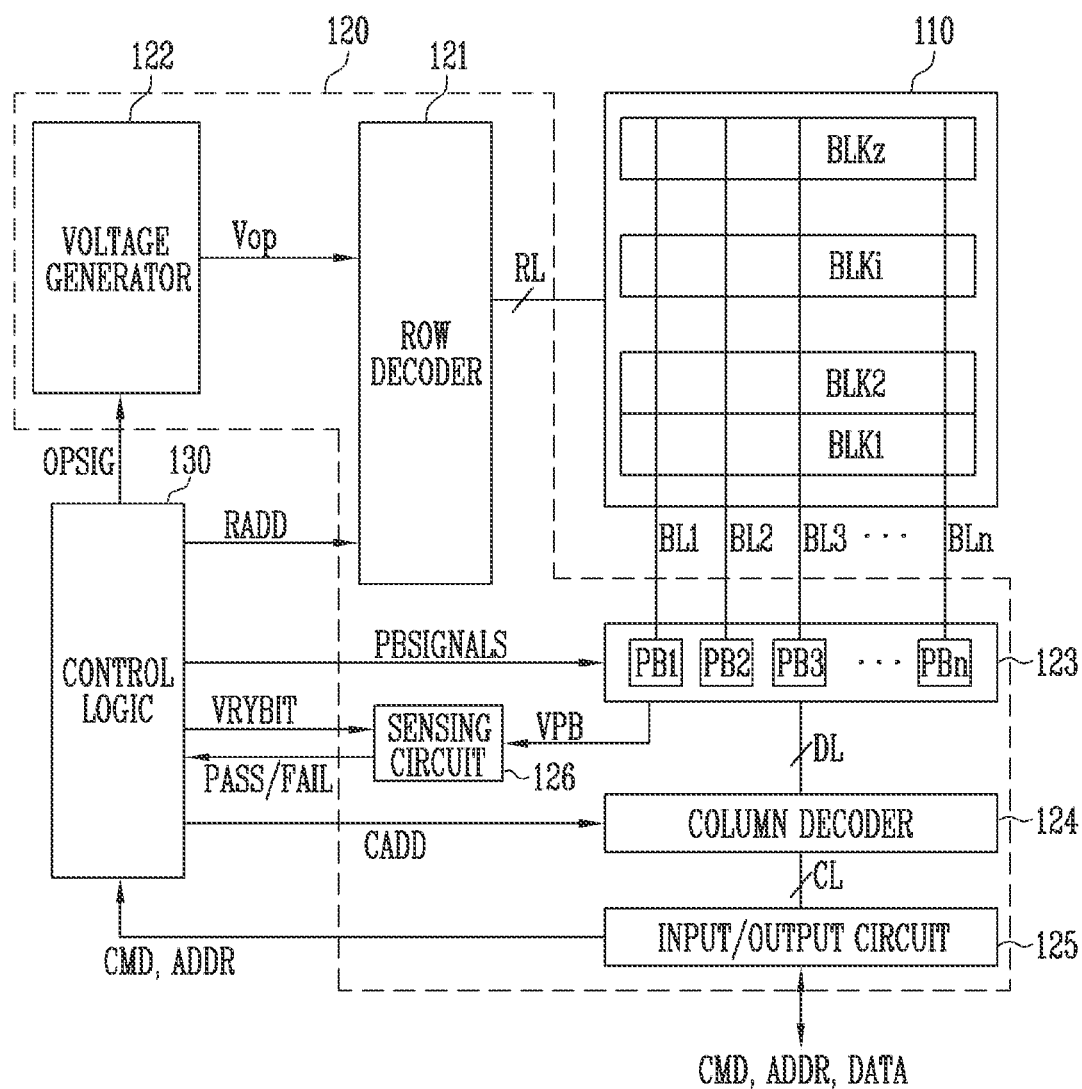
FIG. 2 is a diagram illustrating a memory device according to an embodiment of the present disclosure.

FIG. 2 is a diagram illustrating a memory device according to an embodiment of the present disclosure.

Referring to FIG. 2, a memory device 100 may include a memory cell array 110, a peripheral circuit 120, and a control logic 130.

The memory cell array 110 may include a plurality of memory blocks BLK1 to BLKz. The plurality of memory blocks BLK1 to BLKz may be coupled to a row decoder 121 through row lines RL. Here, the row lines RL may include at least one source select line, a plurality of word lines, and at least one drain select line. Each of the memory blocks BLK1 to BLKz may be coupled to a page buffer group 123 through bit lines BL1 to BLn.

The peripheral circuit 120 may perform a program operation, a read operation, or an erase operation on a selected area of the memory cell array 110 under the control of the control logic 130. That is, the peripheral circuit 120 may drive the memory cell array 110 under the control of the control logic 130. For example, the peripheral circuit 120 may apply various operating voltages to the row lines RL and the bit lines BL1 to BLn or discharge the applied voltages under the control of the control logic 130.

The peripheral circuit 120 may include the row decoder 121, a voltage generator 122, the page buffer group 123, a column decoder 124, an input/output circuit 125, and a sensing circuit 126.

The row decoder 121 may be coupled to the memory cell array 110 through the row lines RL. The row lines RL may include the at least one source select line, the plurality of word lines, and the at least one drain select line. In an embodiment, the word lines may include normal word lines and dummy word lines. Further, the row lines RL may further include a pipe select line.

The row decoder 121 may be operated in response to control of the control logic 130. The row decoder 121 may receive a row address RADD from the control logic 130. In detail, the row decoder 121 may decode the row address RADD. The row decoder 121 may select at least one of the memory blocks BLK1 to BLKz according to the decoded address. Further, the row decoder 121 may select at least one word line of the selected memory block so that voltages generated by the voltage generator 122 are applied to the at least one word line according to the decoded address.

For example, during a program operation, the row decoder 121 may apply a program voltage to a selected word line and apply a program pass voltage having a level lower than that of the program voltage to unselected word lines. During a program verify operation, the row decoder 121 may apply a verify voltage to a selected word line and apply a verify pass voltage higher than the verify voltage to unselected word lines. During a read operation, the row decoder 121 may apply a read voltage to a selected word line and apply a read pass voltage higher than the read voltage to unselected word lines.

In an embodiment, the erase operation of the memory cell array 110 may be performed on a memory block basis. During an erase operation, the row decoder 121 may select one memory block according to the decoded address, and may apply a ground voltage to word lines coupled to the selected memory block.

The voltage generator 122 may be operated under the control of the control logic 130. More specifically, the voltage generator 122 may generate a plurality of voltages using an external supply voltage supplied to the memory device 100 under the control of the control logic 130. For example, the voltage generator 122 may generate a program voltage, a verify voltage, a pass voltage, a read voltage, an erase voltage, etc. under the control of the control logic 130. That is, the voltage generator 122 may generate various operating voltages Vop that are used for program, read, and erase operations in response to an operation signal OPSIG.

The page buffer group 123 may include first to n-th page buffers PB1 to PBn. The first to n-th page buffers PB1 to PBn may be coupled to the memory cell array 110 through the first to n-th bit lines BL1 to BLn, respectively. Further, the first to n-th page buffers PB1 to PBn may be operated under the control of the control logic 130. In detail, the first to n-th page buffers PB1 to PBn may be operated in response to page buffer control signals PBSIGNALS. For example, the first to n-th page buffers PB1 to PBn may temporarily store data received through the first to n-th bit lines BL1 to BLn or may sense voltages or currents of the bit lines BL1 to BLn during a read or verify operation.

The column decoder 124 may transfer data between the input/output circuit 125 and the page buffer group 123 in response to a column address CADD. For example, the column decoder 124 may exchange data with the first to n-th page buffers PB1 to PBn through data lines DL or may exchange data with the input/output circuit 125 through column lines CL.

The input/output circuit 125 may transfer a command CMD and an address ADDR, received from the memory controller 200, to the control logic 130, or may exchange the data DATA with the column decoder 124.

During a read operation or a verify operation, the sensing circuit 126 may generate a reference current in response to an enable bit signal VRYBIT, and may compare a sensing voltage VPB received from the page buffer group 123 with a reference voltage generated by the reference current and then output a pass signal PASS or a fail signal FAIL.

The control logic 130 may control the peripheral circuit 120 by outputting the operation signal OPSIG, the row address RADD, the page buffer control signals PBSIGNALS, and the enable bit VRYBIT in response to the command CMD and the address ADDR.

Further, the control logic 130 may determine whether the verify operation has passed or failed in response to the pass or fail signal PASS or FAIL.

Figure 3:
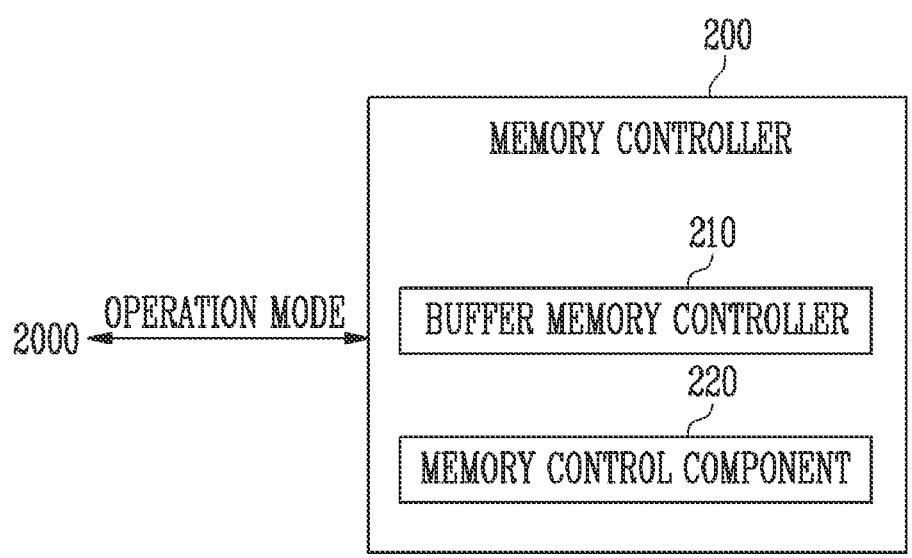
FIG. 3 is a diagram illustrating a memory controller according to an embodiment of the present disclosure.

FIG. 3 is a diagram illustrating a memory controller according to an embodiment of the present disclosure.

Referring to FIG. 3, the memory controller 200 may include a buffer memory controller 210 and a memory control component 220.

The buffer memory controller 210 may control the operation of a buffer memory device 300. In detail, the buffer memory controller 210 may set the size of the buffer memory device 300 depending on the operation mode determined by a host 2000.

For example, when the operation mode determined by the host 2000 is an SPO protection mode, the buffer memory controller 210 may set the size of the buffer memory device 300 to a first size. Further, when the operation mode determined by the host 2000 is a performance mode, the buffer memory controller 210 may set the size of the buffer memory device 300 to a second size larger than the first size. That is, the buffer memory controller 210 may control the size of the buffer memory device 300 by adjusting the size of an area allocated to temporary storage of the write data.

Further, the buffer memory controller 210 may control the buffer memory device 300 by comparing the set size of the buffer memory device 300 with the amount of the buffer memory device 300 that is used. In detail, when the amount of the buffer memory device 300 that is used reaches a preset value, the buffer memory controller 210 may control the buffer memory device 300 so that the data temporarily stored in the buffer memory device 300 is output to the memory device 100. For example, in the case where the operation mode is an SPO protection mode, if the amount of the buffer memory device 300 that is used reaches the first size, the buffer memory controller 210 may control the buffer memory device 300 so that the data temporarily stored in the buffer memory device 300 is flushed. Alternatively, in the case where the operation mode is a performance mode, if the amount of the buffer memory device 300 that is used reaches the second size, the buffer memory controller 210 may control the buffer memory device 300 so that the data temporarily stored in the buffer memory device 300 is flushed.

In accordance with an embodiment of the present disclosure, the buffer memory controller 210 may control the buffer memory device 300 so that, in the SPO protection mode, the data temporarily stored in the buffer memory device 300 is transmitted to the memory device 100 at intervals of a regular period.

The memory control component 220 may control the operation of the memory device 100. More specifically, the memory control component 220 may control the read, write, erase, and background operations of the memory device 100.

Also, the memory control component 220 may control the operation of the memory device 100 depending on the operation mode determined by the host 2000. For example, when the operation mode determined by the host 2000 is an SPO protection mode, the memory control component 220 may control the memory device 100 so that any background operation being performed by the memory device 100 is suspended. Here, the background operation may be an operation such as wear leveling, read reclaim, or garbage collection, which is performed regardless of a request received from the host 2000 so as to enhance the lifetime of the memory device 100. Therefore, the memory control component 220 may control the memory device 100 so that the background operation being performed regardless of the request from the host 2000 is suspended and only an operation corresponding to the request from the host 2000 is performed.

Figure 4:
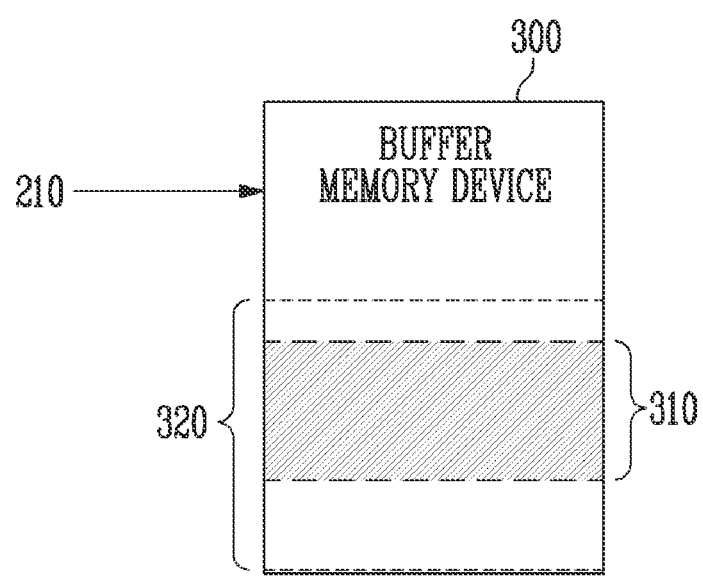
FIG. 4 is a diagram illustrating a buffer memory device according to an embodiment of the present disclosure.

FIG. 4 is a diagram illustrating a buffer memory device according to an embodiment of the present disclosure.

Referring to FIG. 4, an example in which the buffer memory controller 210 controls the size of the buffer memory device 300 to a size corresponding to a first area 310 or a second area 320 is illustrated.

The buffer memory controller 210 may control the size of the buffer memory device 300. For example, when an operation mode is an SPO protection mode, the buffer memory controller 210 may set the size of the buffer memory device 300 to a first size corresponding to the first area 310. Also, when data received from the host 2000 at the first size is temporarily stored in the buffer memory device 300, the buffer memory controller 210 may control the buffer memory device 300 so that the temporarily stored data is output to the memory device 100.

Meanwhile, when the operation mode determined by the host 2000 is a performance mode, the buffer memory controller 210 may set the size of the buffer memory device 300 to a second size corresponding to the second area 320. Also, when data received from the host 2000 at the second size is temporarily stored in the buffer memory device 300, the buffer memory controller 210 may control the buffer memory device 300 so that the temporarily stored data is output to the memory device 100.

The buffer memory controller 210 may allocate a larger area to write data in the performance mode than in the SPO protection mode, and may operate the storage device 1000 more efficiently in the performance mode than in the SPO protection mode. Further, the buffer memory controller 210 may allocate a smaller area to write data in the SPO protection mode than in the performance mode, and may store user data faster in the SPO protection mode than in the performance mode.

Figure 5:
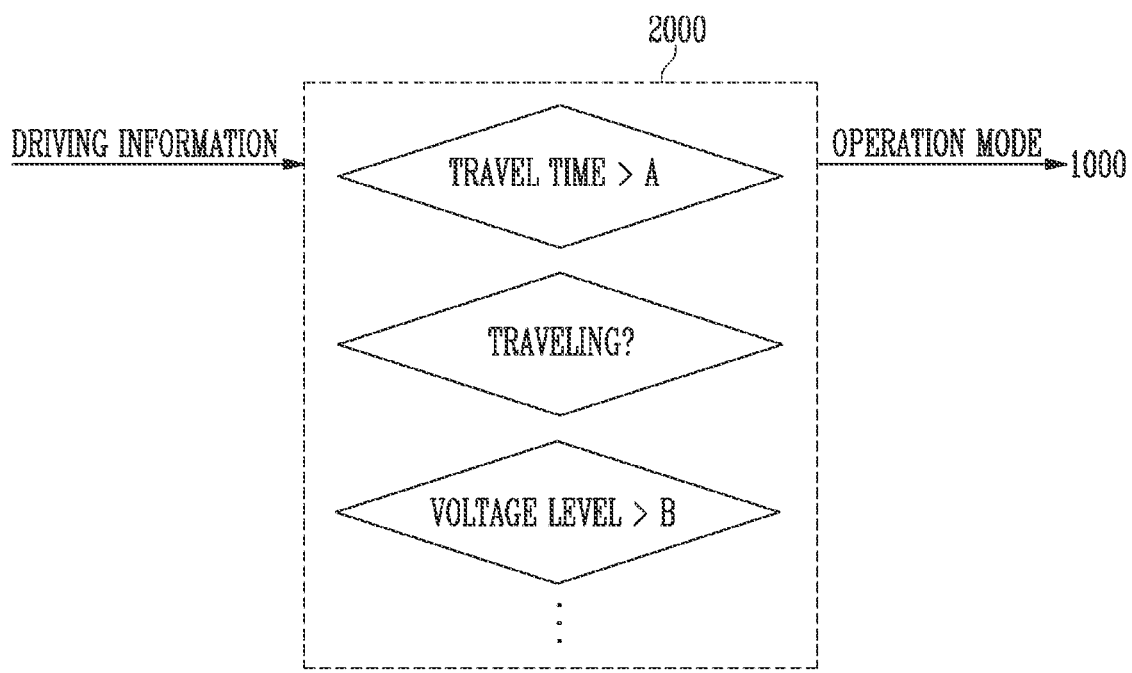
FIG. 5 is a diagram illustrating a host according to an embodiment of the present disclosure.

FIG. 5 is a diagram illustrating a host according to an embodiment of the present disclosure.

Referring to FIG. 5, an example in which the host 2000 determines the operation mode of the storage device 1000 based on driving information is illustrated. The host 2000 may receive raw data from various types of sensors provided in the transportation device and identify the driving information of the transportation device, or may receive the driving information of the transportation device in the form of processed secondary data from various types of sensors. Here, the driving information may include a travel time, indicating the time elapsed since the commencement of travel by the transportation device, and a travel state, indicating the speed of the transportation device. Here, the transportation device may be defined as a transportation means running on a road or on rails. The electronic device 10000 may be a device provided in an internal combustion engine vehicle equipped with an engine as a power source, a device provided in a hybrid vehicle equipped with an engine and an electric motor as a power source, or a device provided in an electric vehicle equipped with an electric motor as a power source.

Also, the host 2000 may judge the possibility of occurrence of a sudden power-off (SPO) based on the driving information of the transportation device. Further, when there is the possibility of occurrence of an SPO, the host 2000 may determine the operation mode of the storage device 1000 to be an SPO protection mode, whereas when there is no possibility of occurrence of an SPO, the host 2000 may determine the operation mode of the storage device 1000 to be a performance mode. The host 2000 may determine the operation mode of the storage device 1000 based on the possibility of occurrence of an SPO.

Here, the performance mode may be a mode in which an operation corresponding to a request from the host 2000 and an operation for the lifetime and management of the storage device 1000 are optimized and performed. The SPO protection mode may be a mode in which the operation corresponding to the request from the host 2000 is prioritized. That is, the SPO protection mode may be a mode in which user data is preferentially stored.

In accordance with an embodiment of the present disclosure, when the travel time of the transportation device is shorter than or equal to a preset time, the host 2000 may determine that there is the possibility of occurrence of an SPO because power corresponding to traveling of the transportation device may not be sufficiently secured. Further, the host 2000 may determine the operation mode of the storage device 1000 to be the SPO protection mode.

Alternatively, when the transportation device is not traveling, the host 2000 may judge that there is the possibility of occurrence of an SPO because power corresponding to traveling of the transportation device may not be sufficiently secured. That is, when the transportation device is in a stopped state, the host 2000 may determine the operation mode of the storage device 1000 to be the SPO protection mode.

When the voltage level of power supplied to the storage device 1000 is less than or equal to a preset level, the host 2000 may judge that there is the possibility of occurrence of an SPO. Further, the host 2000 may determine the operation mode of the storage device 1000 to be the SPO protection mode.

In addition, when it is judged that there is the possibility of occurrence of an SPO, the host 2000 may determine the operation mode of the storage device 1000 to be the SPO protection mode. Then, the host 2000 may request the storage device 1000 to operate in the determined operation mode.

Figure 6:
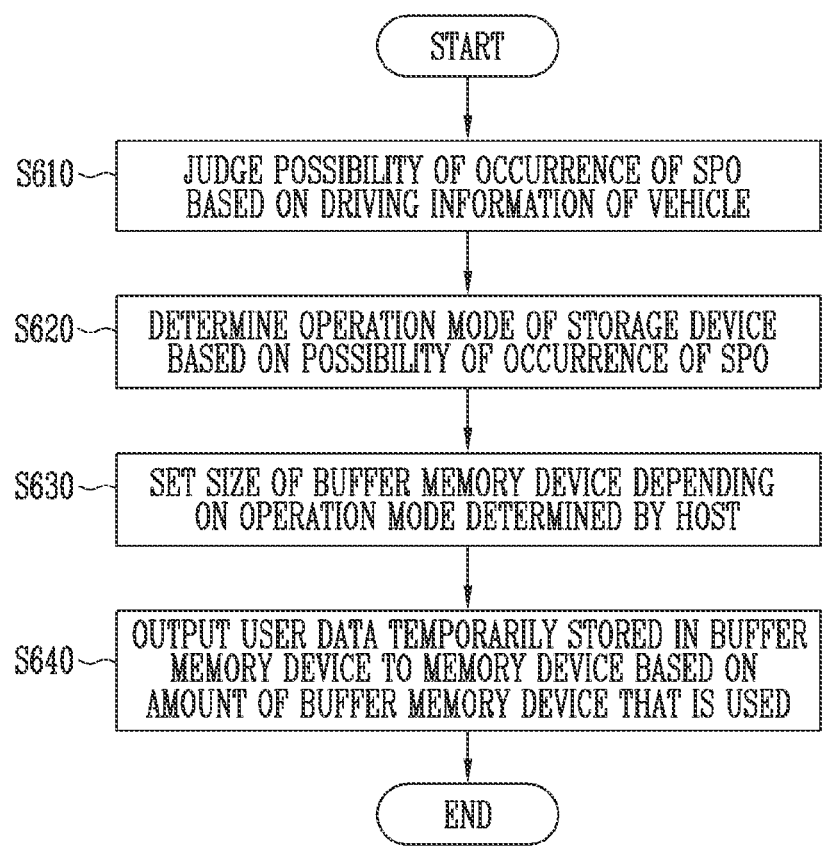
FIG. 6 is a flowchart illustrating a method of operating an electronic device according to an embodiment of the present disclosure.

FIG. 6 is a flowchart illustrating a method of operating an electronic device according to an embodiment of the present disclosure.

Referring to FIG. 6, a method of operating an electronic device 10000 including a storage device 1000 and a host 2000, which are provided in a transportation device, is illustrated. Here, the electronic device 10000 may be a device provided in the transportation device. In detail, the transportation device may be defined as a transportation means running on a road or on rails. The electronic device 10000 may be a device provided in an internal combustion engine vehicle equipped with an engine as a power source, a device provided in a hybrid vehicle equipped with an engine and an electric motor as a power source, or a device provided in an electric vehicle equipped with an electric motor as a power source. For example, the transportation device may include a vehicle, a train, a motorcycle, an airplane, etc., and the electronic device 10000 may be a device provided in the transportation device. The electronic device 10000 may be disposed inside/outside the transportation device or disposed in an area within the transportation device.

The electronic device 10000 may judge the possibility of occurrence of a sudden power-off (SPO) based on the driving information of the transportation device at step S610. In particular, the host 2000 included in the electronic device 10000 may receive driving information of the transportation device from sensors disposed outside/inside the transportation device, and may judge the possibility of occurrence of an SPO based on the driving information. Here, the driving information may include a travel time, indicating the time elapsed since the commencement of travel by transportation device, and a travel state, indicating the speed of the transportation device.

Next, the electronic device 10000 may determine the operation mode of the storage device, including an SPO protection mode or a performance mode, based on the possibility of occurrence of an SPO at step S620. In detail, when there is the possibility of occurrence of an SPO, the electronic device 10000 may determine the operation mode of the storage device 1000 to be the SPO protection mode. In contrast, when there is no possibility of occurrence of an SPO, the electronic device 10000 may determine the operation mode of the storage device 1000 to be the performance mode.

For example, when the travel time of the transportation device is shorter than or equal to a preset time, the electronic device 10000 may determine the operation mode of the storage device 1000 to be the SPO protection mode. Alternatively, when the travel state of the transportation device is a stopped state, the electronic device 10000 may determine the operation mode of the storage device 1000 to be the SPO protection mode.

The electronic device 10000 may determine the operation mode of the storage device 1000 using power supplied to the storage device 1000. In detail, when the voltage level of power supplied to the storage device 1000 is less than or equal to a preset level, the electronic device 10000 may determine the operation mode of the storage device 1000 to be the SPO protection mode.

Further, the electronic device 10000 may set the size of the buffer memory device 300 depending on the operation mode determined by the host 2000 at step S630. In detail, the electronic device 10000 may set the size of the buffer memory device 300 to a first size in the SPO protection mode, and may set the size of the buffer memory device 300 to a second size, larger than the first size in the performance mode.

Further, the electronic device 10000 may output user data temporarily stored in the buffer memory device 300 to the memory device 100 based on the amount of the buffer memory device 300 that is used at step S640. When the amount of the buffer memory device 300 that is used reaches the set size of the buffer memory device 300, the electronic device 10000 may flush the data stored in the buffer memory device 300.

Meanwhile, the electronic device 10000 may control the storage device 1000 so that, in the SPO protection mode, a background operation being performed regardless of a request from the host 2000 is suspended and only an operation corresponding to the request from the host 2000 is performed.

Furthermore, the electronic device 10000 may control the storage device 1000 so that, in the SPO protection mode, data temporarily stored in the buffer memory device 300 is output to the memory device 100 at intervals of a preset period.

Figure 7:
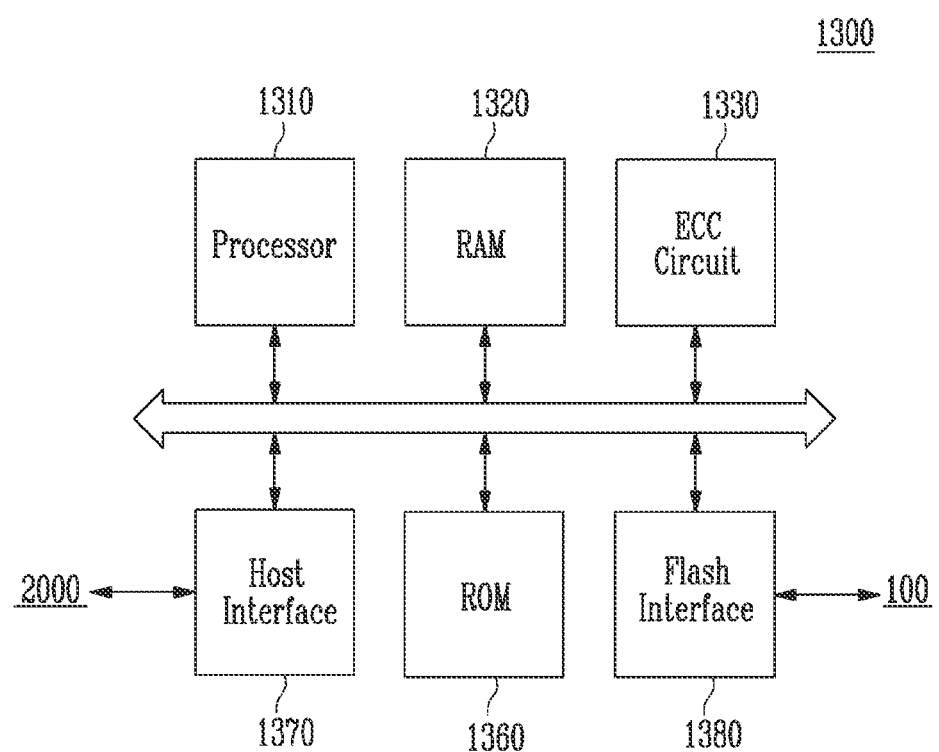
FIG. 7 is a diagram illustrating a memory controller according to an embodiment of the present disclosure.

FIG. 7 is a diagram illustrating a memory controller according to an embodiment of the present disclosure.

Referring to FIG. 7, a memory controller 1300 may include a processor 1310, a RAM 1320, an error correction circuit (ECC circuit) 1330, a ROM 1360, a host interface 1370, and a flash interface 1380. The memory controller 1300 illustrated in FIG. 7 may be an embodiment of the memory controller 200 illustrated in FIG. 3.

The processor 1310 may communicate with a host 2000 using the host interface 1370, and may perform a logical operation so as to control the operation of the memory controller 1300. For example, in response to requests received from the host 2000 or an external device, the processor 1310 may load a program command, a data file, a data structure, etc., and may perform various types of operations or generate commands and addresses. For example, the processor 1310 may generate various commands required for a program operation, a read operation, an erase operation, a suspend operation, and a parameter setting operation.

Also, the processor 1310 may perform a function of a flash translation layer (FTL). The processor 1310 may translate a logical block address (LBA), provided by the host 2000, into a physical block address (PBA) through the FTL. The FTL may receive the LBA and translate the LBA into the PBA using a mapping table. Examples of an address mapping method performed through the FTL may include various methods according to a mapping unit. Representative address mapping methods include a page mapping method, a block mapping method, and a hybrid mapping method.

Further, the processor 1310 may generate commands without receiving a request from the host 2000. For example, the processor 1310 may generate commands for background operations such as operations for wear leveling of the memory device 100 and operations for garbage collection of the memory device 100.

The RAM 1320 may be used as a buffer memory, a working memory or a cache memory of the processor 1310. The RAM 1320 may store codes and commands that are executed by the processor 1310. The RAM 1320 may store data that is processed by the processor 1310. Further, in implementation of the RAM 1320, the RAM 1320 may be implemented to include a static RAM (SRAM) or a dynamic RAM (DRAM).

The error correction circuit 1330 may detect errors and correct the detected errors during a program operation or a read operation. In detail, the error correction circuit 1330 may perform an error correction operation based on error correction code (ECC). Also, the error correction circuit 1330 may perform error correction encoding (ECC encoding) based on data to be written to the memory device 100. The ECC-encoded data may be transferred to the memory device 100 through the flash interface 1380. Further, the error correction circuit 1330 may perform error correction decoding (ECC decoding) on data received from the memory device 100 through the flash interface 1380.

The ROM 1360 may be used as a storage unit which stores various types of information required for the operation of the memory controller 1300. In detail, the ROM 1360 may include a map table, in which physical-logical address information and logical-physical address information may be stored. Further, the ROM 1360 may be controlled by the processor 1310.

The host interface 1370 may include a protocol for performing data exchange between the host 2000 and the memory controller 1300. In an embodiment, the host interface 1370 may communicate with the host 2000 through at least one of various interface protocols such as a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer system interface (SCSI) protocol, an enhanced small disk interface (ESDI) protocol, an integrated drive electronics (IDE) protocol, and a private protocol.

The flash interface 1380 may communicate with the memory device 100 using a communication protocol under the control of the processor 1310. In detail, the flash interface 1380 may transmit/receive commands, addresses, and data to/from the memory device 100 through a channel. For example, the flash interface 1380 may include a NAND interface.

Figure 8:
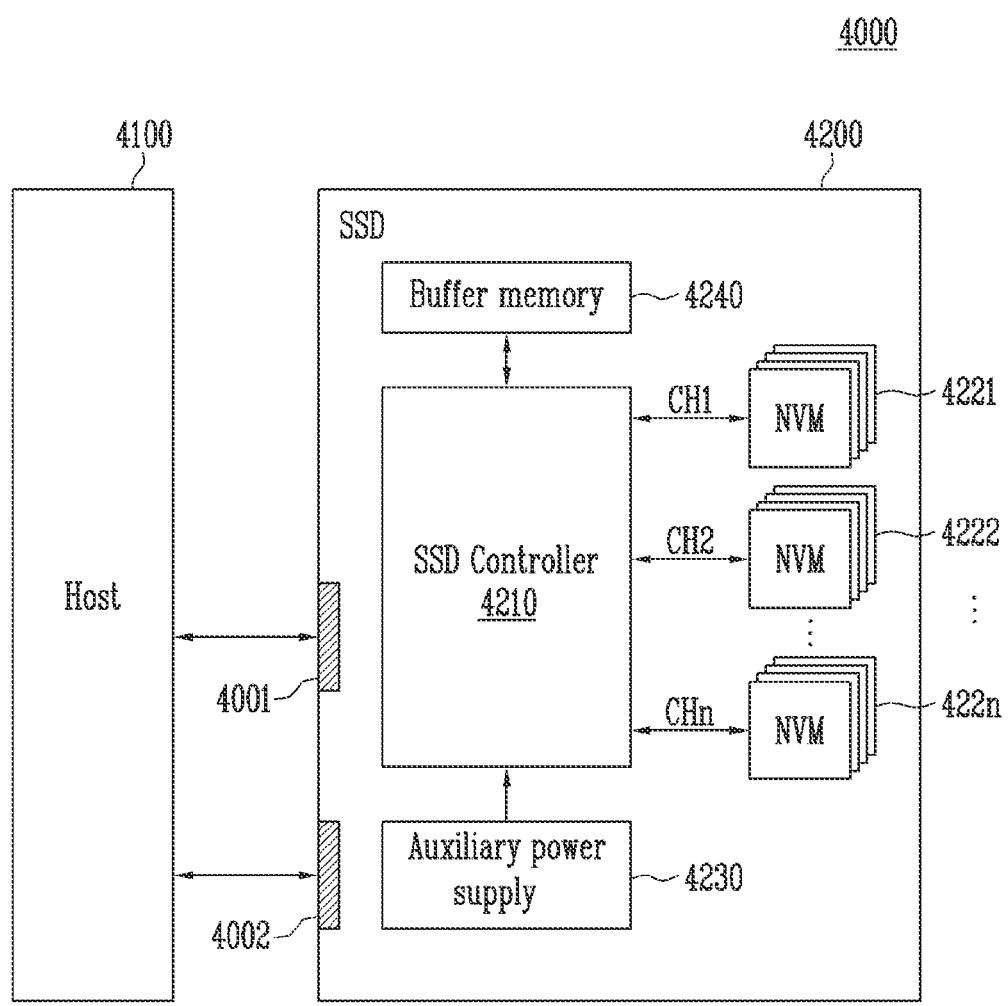
FIG. 8 is a diagram illustrating a solid state drive (SSD) system according to an embodiment of the present disclosure.

FIG. 8 is a diagram illustrating a solid state drive (SSD) system according to an embodiment of the present disclosure.

Referring to FIG. 8, an SSD system 4000 may include a host 4100 and an SSD 4200. The SSD 4200 may exchange a signal with the host 4100 through a signal connector 4001, and may be supplied with power through a power connector 4002. The SSD 4200 may include an SSD controller 4210, a plurality of flash memories 4221 to 422*n*, an auxiliary power supply 4230, and a buffer memory 4240.

In an embodiment, the SSD controller 4210 may perform a function of the memory controller 200, described above with reference to FIG. 1. The SSD controller 4210 may control the plurality of flash memories 4221 to 422*n* through channels CH1 to CHn in response to the signal received from the host 4100. In an embodiment, the signal may indicate signals based on the interfaces of the host 4100 and the SSD 4200. For example, the signal may be a signal defined by at least one of various interfaces such as universal serial bus (USB), multimedia card (MMC), embedded MMC (eMMC), peripheral component interconnection (PCI), PCI-express (PCI-E), an advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), Wi-Fi, Bluetooth, and nonvolatile memory express (NVMe) interfaces.

The auxiliary power supply 4230 may be coupled to the host 4100 through the power connector 4002. The auxiliary power supply 4230 may be supplied with power from the host 4100, and may be charged. The auxiliary power supply 4230 may supply the power of the SSD 4200 when the supply of power from the host 4100 is not smoothly performed. In an embodiment, the auxiliary power supply 4230 may be located inside the SSD 4200 or located outside the SSD 4200. For example, the auxiliary power supply 4230 may be located in a main board, and may also provide auxiliary power to the SSD 4200.

The buffer memory 4240 may function as a buffer memory of the SSD 4200. For example, the buffer memory 4240 may temporarily store data received from the host 4100 or data received from the plurality of flash memories 4221 to 422*n*, or may temporarily store metadata (e.g., mapping tables) of the flash memories 4221 to 422*n*. The buffer memory 4240 may include volatile memories, such as DRAM, SDRAM, DDR SDRAM, LPDDR SDRAM, and GRAM, or nonvolatile memories, such as FRAM, ReRAM, STT-MRAM, and PRAM.

FIG. 9 is a diagram illustrating a user system according to an embodiment of the present disclosure.

Referring to FIG. 9, a user system 5000 may include an application processor 5100, a memory module 5200, a network module 5300, a storage module 5400, and a user interface 5500.

The application processor 5100 may execute components included in the user system 5000, an operating system (OS), a user program or the like. In an embodiment, the application processor 5100 may include controllers, interfaces, graphic engines, etc. for controlling the components included in the user system 5000. The application processor 5100 may be provided in the form of a system-on-chip (SoC).

The memory module 5200 may function as a main memory, a working memory, a buffer memory or a cache memory of the user system 5000. The memory module 5200 may include volatile RAMs such as DRAM, SDRAM, DDR SDRAM, DDR2 SDRAM, DDR3 SDRAM, LPDDR SDARM, LPDDR2 SDRAM, and LPDDR3 SDRAM or nonvolatile RAMs such as PRAM, ReRAM, MRAM, and FRAM. In an embodiment, the application processor 5100 and the memory module 5200 may be packaged based on a package-on-package (POP), and may then be provided as a single semiconductor package.

The network module 5300 may communicate with external devices. In an embodiment, the network module 5300 may support wireless communication, such as code division multiple access (CDMA), global system for mobile communication (GSM), wideband CDMA (WCDMA), CDMA-2000, time division multiple access (TDMA), long term evolution (LTE), Wimax, wireless LAN (WLAN), UWB, Bluetooth, or Wi-Fi. In an embodiment, the network module 5300 may be included in the application processor 5100.

The storage module 5400 may store data. For example, the storage module 5400 may store data received from the application processor 5100. Alternatively, the storage module 5400 may transmit the data stored in the storage module 5400 to the application processor 5100. In an embodiment, the storage module 5400 may be implemented as a nonvolatile semiconductor memory device, such as a phase-change RAM (PRAM), a magnetic RAM (MRAM), a resistive RAM (RRAM), a NAND flash memory, a NOR flash memory, or a NAND flash memory having a three-dimensional (3D) structure. In an embodiment, the storage module 5400 may be provided as a removable storage medium (removable drive), such as a memory card or an external drive of the user system 5000.

In an embodiment, the storage module 5400 may include a plurality of nonvolatile memory devices, each of which may be operated in the same manner as the memory device, described above with reference to FIG. 1. The storage module 5400 may be operated in the same manner as the storage device 1000, described above with reference to FIG. 1.

The user interface 5500 may include interfaces which input data or instructions to the application processor 5100 or output data to an external device. In an embodiment, the user interface 5500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 5500 may include user output interfaces such as a liquid crystal display (LCD), an organic light-emitting diode (OLED) display device, an active matrix OLED (AMOLED) display device, an LED, a speaker, and a monitor.

In accordance with the present disclosure, there are provided an electronic device for preparing for a sudden power-off (SPO) based on driving information of a transportation device, and a method of operating the electronic device.

What is claimed is:
1. An electronic device, comprising:
  a storage device comprising a buffer memory device, a memory device, and a memory controller; and
  a host configured to determine, before a sudden power-off (SPO) occurs, a possibility of occurrence of the SPO based on driving information of a vehicle, and determine an operation mode of the storage device to be a SPO protection mode or a performance mode based on the possibility of the occurrence of the SPO,
  wherein the buffer memory device is configured to temporarily store user data received from the host,
  wherein the memory device is configured to store the user data output from the buffer memory device,
  wherein, when it is determined before the SPO occurs that there is the possibility of occurrence of the SPO, the memory controller is configured to control the memory device in the SPO protection mode to suspend a background operation being performed regardless of a request from the host and control the memory device to perform an operation corresponding to the request from the host,
  wherein the operation corresponding to the request includes a program operation, a read operation or an erase operation, and wherein the memory controller is configured to control the buffer memory device to output the user data from the buffer memory device to the memory device at intervals of a regular period when the determined operation mode is the SPO protection mode.

2. The electronic device according to claim 1, wherein the host is configured to:
    determine the possibility of the occurrence of the SPO based on the driving information of the vehicle, and determine the operation mode to be the SPO protection mode when there is the possibility of the occurrence of the SPO, and
    determine the operation mode of the storage device to be the performance mode when there is no possibility of the occurrence of the SPO.

3. The electronic device according to claim 1, wherein the driving information includes a travel time indicating a time amount elapsed since commencement of travel by the vehicle, and a travel state indicating a speed of the vehicle.

4. The electronic device according to claim 3, wherein the host determines the operation mode to be the SPO protection mode when the travel time is shorter than or equal to a preset time.

5. The electronic device according to claim 1,
    further comprising a power supply configured to supply power to the storage device,
    wherein the host determines the operation mode to be the SPO protection mode when a voltage level of the power is less than or equal to a preset level.

6. The electronic device according to claim 1, wherein the memory controller determines a size of the buffer memory device to a first size when the determined operation mode is the SPO protection mode, and to a second size larger than the first size when the determined operation mode is the performance mode.

7. The electronic device according to claim 6, wherein the memory controller controls the buffer memory device to output the user data by flushing the user data from the buffer memory device to the memory device, in response to the amount of the user data reaching the determined size of the buffer memory device.

8. A method of operating an electronic device including a storage device comprising a buffer memory device and a memory device, and a host that are provided in a vehicle, the method comprising:
    determining, before a sudden power-off (SPO) occurs, a possibility of occurrence of the SPO based on driving information of the vehicle;
    determining an operation mode of the storage device including a SPO protection mode or a performance mode based on the possibility of the occurrence of the SPO;
    when it is determined before the SPO occurs that there is the possibility of occurrence of the SPO, suspending a background operation being performed regardless of a request from the host, in response to the determined operation mode being the SPO protection mode; and
    performing an operation corresponding to the request from the host,
    wherein the operation corresponding to the request includes a program operation, a read operation or an erase operation, and
    wherein user data is output from the buffer memory device to the memory device at intervals of a regular period when the determined operation mode is the SPO protection mode.

9. The method according to claim 8, wherein determining the operation mode comprises:
    when there is the possibility of the occurrence of the SPO, determining the operation mode to be the SPO protection mode; and
    when there is no possibility of the occurrence of the SPO, determining the operation mode of the storage device to be the performance mode.

10. The method according to claim 8, wherein the driving information includes a travel time indicating a time amount elapsed since commencement of travel by the vehicle, and a travel state indicating a speed of the vehicle.

11. The method according to claim 10, wherein determining the operation mode comprises determining the operation mode to be the SPO protection mode in response to the travel time being shorter than or equal to a preset time.

12. The method according to claim 10, wherein determining the operation mode comprises determining the operation mode to be the SPO protection mode, in response to the travel state indicating a stopped state.

13. The method according to claim 8,
    further comprising supplying power to the storage device,
    wherein determining the operation mode comprises determining the operation mode to be the SPO protection mode in response to a voltage level of the power being less than or equal to a preset level.

14. The method according to claim 8, further comprising:
    determining a size of the buffer memory device to a first size in response to the determined operation mode being the SPO protection mode; and
    determining the size of the buffer memory device to a second size larger than the first size in response to the determined operation mode being the performance mode.

15. The method according to claim 14, further comprising outputting the user data,
    wherein outputting the user data comprises flushing the user data from the buffer memory device to the memory device in response to the amount of the user data reaching the determined size of the buffer memory device.

16. An operating method of an apparatus mounted on a vehicle and including a host and a memory system comprising a buffer memory and a memory device, the operating method comprising:
    sensing, by the host, one or more of a mobility status of the vehicle and a power status of the memory system;
    determining, before a sudden power-off (SPO) occurs, by the host and based on a result of the sensing, an operation mode of the memory system;
    when it is determined before the SPO occurs that there is the possibility of occurrence of the SPO, suspending a background operation being performed regardless of a request from the host, in response to the determined operation mode being a SPO protection mode; and
    performing an operation corresponding to the request from the host,
    wherein the buffer memory is configured to provide the memory device with data buffered therein,
    wherein the memory device is configured to store therein the provided data,
    wherein the operation corresponding to the request includes a program operation, a read operation or an erase operation, and wherein user data is output from the buffer memory device to the memory device at intervals of a regular period when the determined operation mode is the SPO protection mode.

* * * * *